(12) United States Patent
Morinigo et al.

(10) Patent No.: US 7,451,186 B2
(45) Date of Patent: Nov. 11, 2008

(54) METHOD AND SYSTEM OF INTEGRATING INSTANT MESSAGING WITH OTHER COMPUTER PROGRAMS

(75) Inventors: Jorge A. Morinigo, Newcastle, WA (US); Tang Li, Bellevue, WA (US); Reed A. Vawter, Redmond, WA (US); Han-yi Shaw, Redmond, WA (US); Isabella E. Carniato, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 10/916,297

(22) Filed: Aug. 10, 2004

(65) Prior Publication Data
US 2006/0036692 A1    Feb. 16, 2006

(51) Int. Cl.
*G06F 15/16* (2006.01)
(52) U.S. Cl. ........................... 709/206; 719/328
(58) Field of Classification Search ......... 709/204–207; 719/328
See application file for complete search history.

(56) References Cited
U.S. PATENT DOCUMENTS 7,194,516 B2 *  3/2007  Giacobbe et al. ............ 709/206
2002/0178087 A1 * 11/2002  Henderson et al. ............ 705/26
2004/0024822 A1 *  2/2004  Werndorfer et al. ......... 709/206
2005/0044152 A1 *  2/2005  Hardy et al. ................. 709/206
2005/0080852 A1 *  4/2005  Kelley et al. ................. 709/206

* cited by examiner

*Primary Examiner*—Salad Abdullahi
(74) *Attorney, Agent, or Firm*—Workman Nydegger

(57) ABSTRACT

Described is a system and method by which client programs such as desktop applications can use instant messaging functionality. An application program interface is provided that allows a client program (e.g., an application program) to interact with an instant messaging infrastructure, such as via event calls to initiate conversations, send messages and/or obtain presence information. This enables other programs to create new user experiences that integrate the messaging infrastructure, such as displaying presence, or enabling instant messages to be sent from within an application program. Document collaboration is also facilitated, by allowing users to send instant messages (or the document) to other users, including sending an instant message directly to a user associated with a specific comment or change to the document.

37 Claims, 7 Drawing Sheets

METHOD AND SYSTEM OF INTEGRATING INSTANT MESSAGING WITH OTHER COMPUTER PROGRAMS

FIELD OF THE INVENTION

The invention relates generally to computing systems, and more particularly to instant messaging on a computer system.

BACKGROUND

Instant messaging is a communications service that enables one user to communicate text in real time over the Internet to and from another user. Typically, the instant messaging service allows each a user to build a private list of other users, and for each listed user, provides an alert whenever another user on that private list is online. An instant messaging session may then be initiated.

While instant messaging applications are generally free, standalone programs used for simple chat-like communications, other real-time communication scenarios could benefit from having instant messaging communications. For example, enterprise personnel and others computer users such as students could benefit from being able to seamlessly communicate instant messages while working with other application programs. At present, however, instant messaging programs are independent of any other programs. What is needed is a way for other programs to access instant messaging functionality in a manner that benefits users who work in various real-time communication scenarios.

SUMMARY OF THE INVENTION

Briefly, the present invention is directed towards a system and method that provide application and other programs (e.g., operating system components) with access to an instant messenger service's functionality. In one implementation, an instant messaging program is separated into a user interface component by which users may send instant messages in a more traditional manner, and a background component (e.g., a daemon process) in which much of the communication-related structure and functionality of the instant messaging service is provided. An application programming interface allows programs to work with the background component, allowing instant messaging functionality to be integrated with other programs on a computer system. Further, the background component communicates integration data with other programs, allowing an application to richly interact with the instant messenger service.

In one implementation, an application programming interface (or interfaces) supports a primary client (e.g., the user interface application) that fully interacts with the messenger service, and one or more secondary clients (e.g., a word processor program). This secondary client can expose the contact list, and can also take advantage of complete instant messaging functionality, such as by launching the instant messenger user interface component and sending the user to the interface. In this implementation, the various components and client programs may communicate via a defined set of AppleEvents. Further, the background application is also responsible for communicating integration data with other select applications. These AppleEvents thus define the API that allows rich interaction with the Messenger service.

The various clients thus communicate with the messenger background component through the API set, and may also provide callback data to the messenger background component. Actions that client programs may perform via this API set include determining when the user signs in or signs out, and obtaining the instant messaging contact list, obtaining presence information as to who else is online, and so forth. Other operations that the client programs can perform include changing a stored password, changing the online status and changing the familiar name. Further, the client programs may initiate an instant message conversation with another user, obtain a list of currently online users (buddies), and initiate invitations to allow application sharing, remote control, gaming, and so forth. New functionality may be added to the messenger component and/or messenger user interface component, such as to add contacts from the messenger program.

The present invention thus allows an application (or suite of applications) to become an instant message hub by allowing users to communicate in real-time, based on presence information (e.g., which other users are signed in). Instant messaging access from programs may be provided in various ways, such as via an icon. Further, document collaboration using instant messaging is facilitated, such as by allowing a user to send an instant message or document to another user identified in a interlineations markup balloon.

Other advantages will become apparent from the following detailed description when taken in conjunction with the drawings, in which:

DETAILED DESCRIPTION

Exemplary Operating Environment

Figure 1:
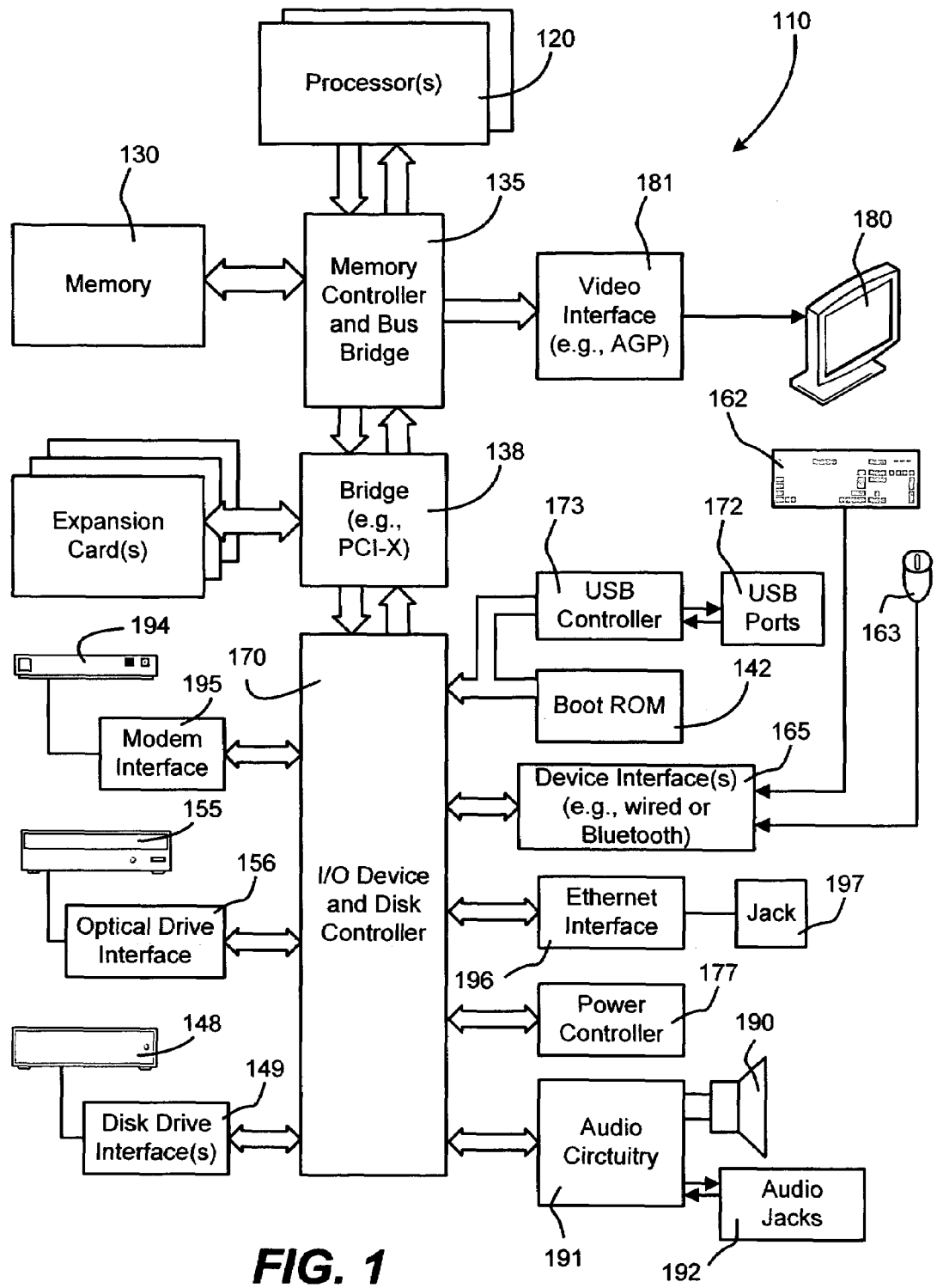
FIG. 1 is a block diagram generally representing a computer system into which the present invention may be incorporated.

FIG. 1 illustrates an example of a suitable computing system environment on which the invention may be implemented. The computing system environment is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120 containing one ore more processors, a system memory 130, and a bus structure (e.g., memory controller/bus bridge) 135 that couples various system components including the system memory to the processing unit 120. The bus structure 135 and/or other bus bridge mechanisms 138 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and/or PCI-X.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) and random access memory (RAM). A boot ROM 142, containing the basic routines that help to transfer information between elements within computer 110, such as during start-up, may be independently coupled to the system, as shown in FIG. 1. The memory typically contains data and/or program modules that are immediately accessible to and/or presently being operated on by the processing unit 120. By way of example, and not limitation, examples include a host operating system, a guest operating system, application programs, other program modules and program data.

The computer 110 may also include other removable/non-removable, volatile/nonvolatile computer storage media. By way of example only, FIG. 1 illustrates a hard disk drive 148 and interface 149 that reads from or writes to non-removable, nonvolatile magnetic media, an optical disk drive 155 and interface 156 that reads from or writes to a removable, nonvolatile optical disk such as a CD-ROM or DVD-ROM or other optical media. Other removable/non-removable, volatile/nonvolatile computer storage media that can be used in the exemplary operating environment include, but are not limited to, magnetic tape cassettes, flash memory cards, USB drives, digital versatile disks, digital video tape, solid state RAM, solid state ROM, and the like.

The drives and their associated computer storage media, discussed above and illustrated in FIG. 1, provide storage of computer-readable instructions, data structures, program modules and other data for the computer 110. For example, the hard disk drive 148 may store the host and guest operating systems, application programs, other program modules and program data. Note that these components may be the same as or different from those loaded in the memory 130, although they are typically different instances.

A user may enter commands and information into the computer 110 through input devices such as a keyboard 162 and pointing device 163 (e.g., a mouse), and/or via other well-known input means including a tablet, electronic digitizer, microphone, trackball or touch pad. Other input devices not shown in FIG. 1 may include a joystick, game pad, satellite dish, scanner, or the like. These and other input devices are often connected to the processing unit 120 through a wired and/or wireless input interface 165 that is coupled to the system such as via an I/O device and disk controller 170, but may be connected by other interface and bus structures, such as a parallel port, game port or a universal serial bus (USB) port 172 and its controller 173. Other mechanisms that may be connected to the controller 170 include a power controller 177.

A monitor 180 or other type of display device is also connected to the system bus 121 via an interface, such as a video interface 181. The monitor 180 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 190 connected via audio circuitry 191 and/or audio jacks 192 and/or a printer, which may be connected through an output peripheral interface or the like.

The computer 110 may operate in a networked environment using logical connections to one or more remote computers, which may be a personal computer, a server, a router, a network PC, a peer device or other common network node, and typically includes many or all of the elements described above relative to the computer 110. Such networks include a local area network (LAN) and a wide area network (WAN), which may be accessed via a modem 194 and modem interface 195 and/or an Ethernet interface 196 and jack 197 and/or, but may also include other networks. Such networking environments are commonplace in offices, enterprise-wide computer networks, intranets and the Internet. It will be appreciated that the network connections shown are exemplary and other means of establishing a communications link between the computers may be used.

Instant Messaging for Other Programs

The present invention is generally directed towards a system and method by which various application programs and other programs (such as operating system components) can integrate with an instant messaging service. As will be understood, numerous ways to implement the present invention are feasible, and only some of the alternatives are described herein. For instance, many of the examples herein will be described with reference to a Macintosh-based operating system and architecture, using AppleEvents as a communication protocol. However, the present invention is not limited to any alternative described herein, nor is it limited to particular architecture, operating environment, platform and/or operating system. Rather, the present invention provides benefits and advantages in computing in general.

Figure 2:
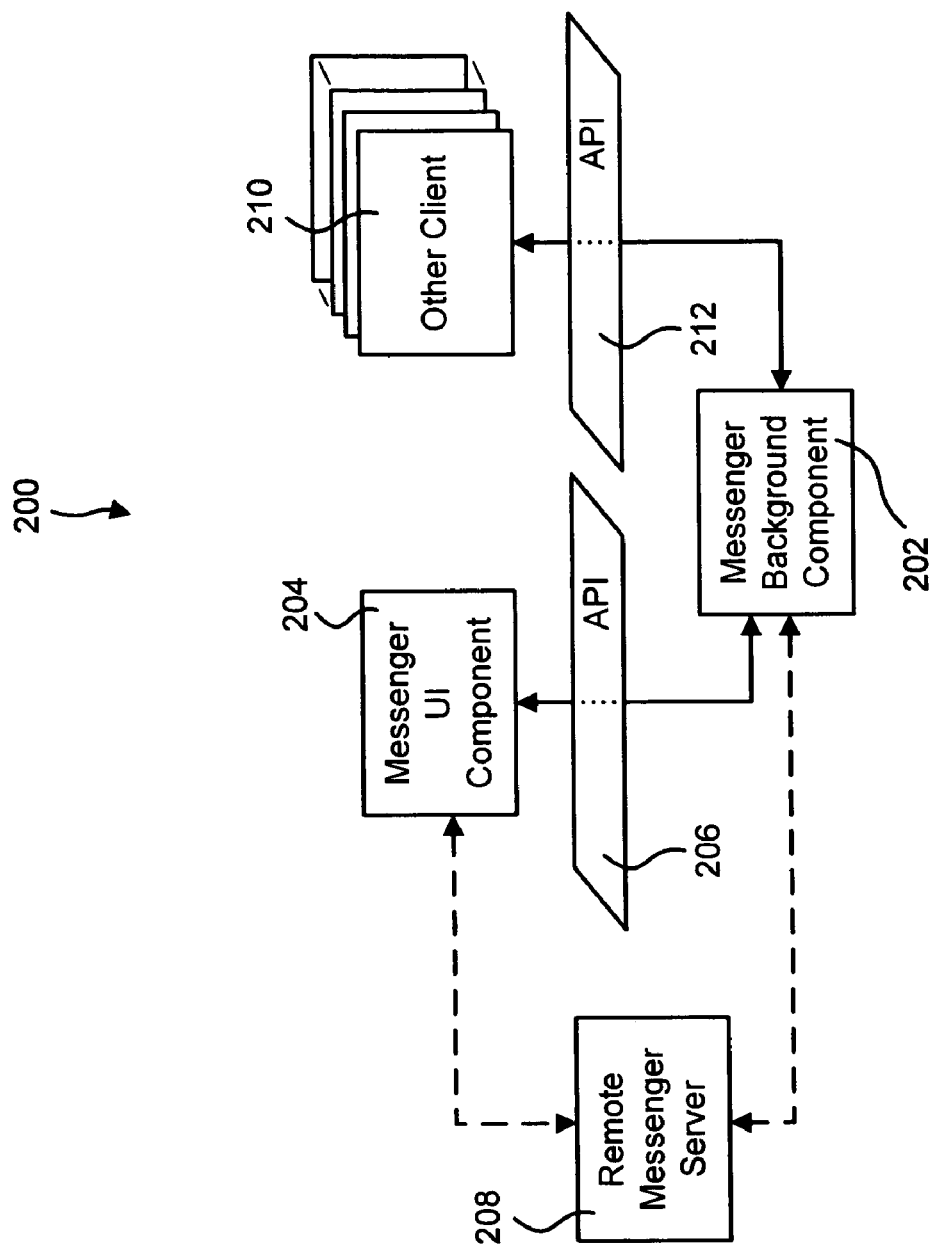
FIG. 2 is a block diagram generally representing an architecture that allows external clients to integrate with a messaging infrastructure, in accordance with various aspects of the present invention.

As represented in FIG. 2, there is shown an example architecture 200 in which a messenger service has been separated into two components, namely a messenger background component 202, which may comprise a daemon process, and a messenger user interface (UI) component 204. A first API (application programming interface) set 206 interfaces the messenger background component 202 with the messenger UI component 204; traditionally, there has been no such separation.

In general, the messenger background component 202 is responsible for interfacing with a remote messenger server 208, while the UI component 204 allows the user to interact with the messenger service. In essence, the user need not know about the separation, and, for example, may work with the UI component 204 and not recognize any difference from conventional standalone instant messaging systems. As can be readily appreciated, which functions are performed by the messenger background component 202 and which are performed by the messenger UI component 204 is somewhat arbitrary, except for efficiency purposes and avoiding duplication.

Figure 3A:
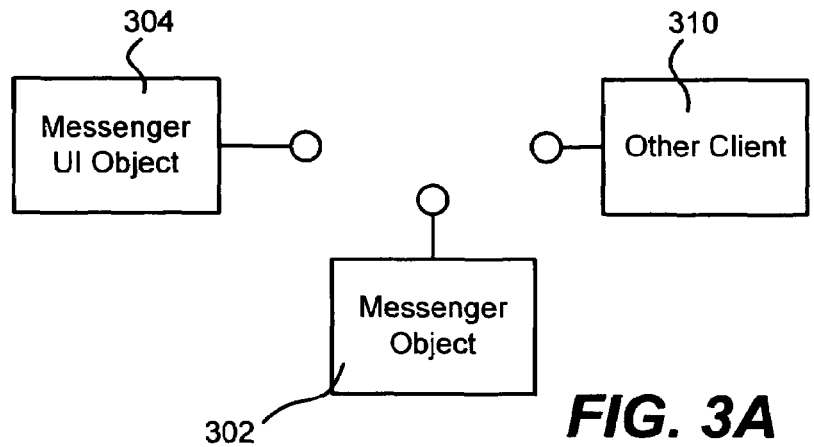
FIGS. 3A-3C comprise alternative architectures that allow external clients to integrate with a messaging infrastructure, in accordance with various aspects of the present invention.
Figure 3B:
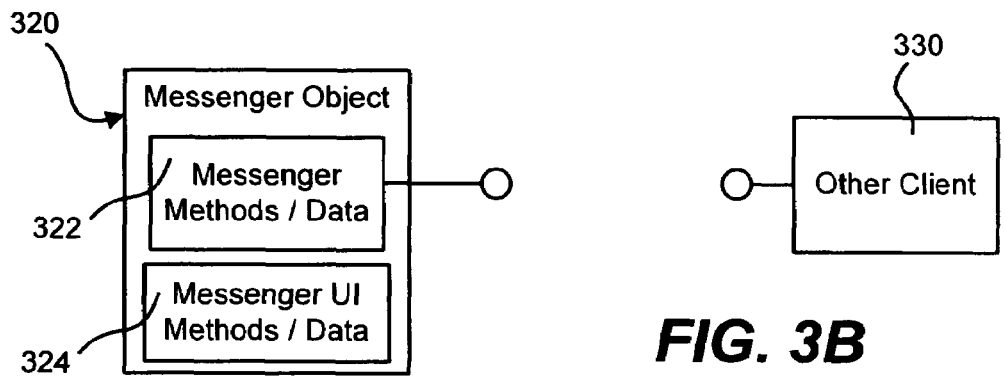
Figure 3C:
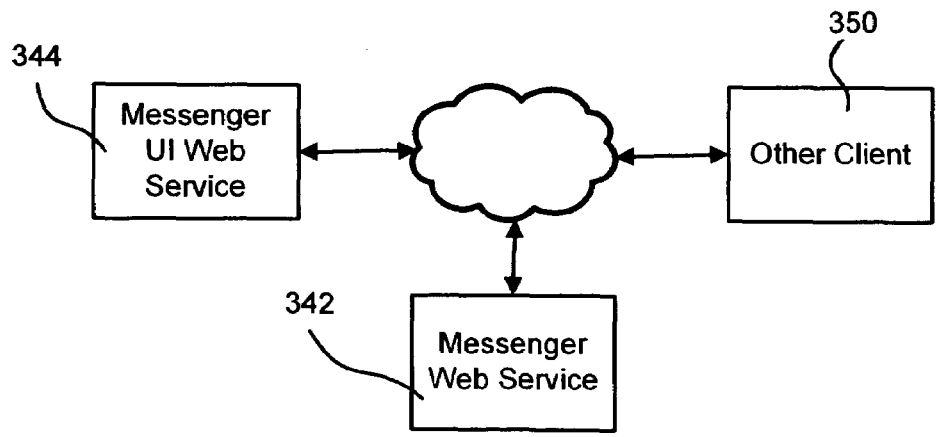

In one implementation, the messenger background component 202 and the UI component 204 communicate via a defined set of AppleEvents, that is, the set of AppleEvents defines the first API set 206. It is understood, however, that any other protocols and/or ways to interface between components, including providing a library of function calls, providing defined methods, providing defined web service messages, and so forth are equivalent. For example, the components can be implemented in an object model, in which clients call object methods, or in a web services environment, in which a client calls a web service, with SOAP/XML (Simple Object Access Protocol/extensible Markup Language) messages exchanged. Some of these other alternatives are shown in FIGS. 3A-3C; e.g., in FIG. 3A there is shown background, UI and client objects 302, 304 and 310, respectively, while in FIG. 3B there is shown a single messenger object 320 with internal UI methods and data and some methods and data exposed to other clients 330. FIG. 3C shows a web services environment, in which instant message functionality is accomplished via communications exchanged between a web service client 350, a messenger web service 342 and a messenger UI web service 344. For purposes of simplicity herein, the present invention will be primarily described with reference to FIG. 2, generally using AppleEvents for communications. In accordance with an aspect of the present invention, the messenger background component 202 may be accessed by other client programs 210 that are aware of the messenger background component 202. Such programs may include application programs such as word processing programs, spreadsheet programs, web browsers, email programs, suites (such as Microsoft® Office) and/or project management programs. Other programs such as operating system components, utilities, debugging programs and so on may also interface with the messenger background component 202. To this end, a second API set 212 is provided. As described below, the messenger background component 202 is also responsible for communicating integration data to the other programs 210. In general, each program 210 represents a client that wants to start sessions with other users, wherein a session may be an instant message session (chat) or a file transfer. Other types of sessions, such as "app invites," are feasible.

In one implementation, the messenger UI component 204 comprises a primary client that can fully interact with the messenger background component 202. In general, the first API set 206 allows the messenger UI component 204 to perform any actions that a standalone program's user interface can perform, as if there was not any separation. The secondary client program or programs can interact with the messenger background component 202, but generally have a more limited interaction. The second API set 210 may thus be a subset of the first API set 206.

In general and as described below, the clients 210 communicate with the messenger background component 202 through the API set 212, and may also provide callbacks to the messenger background component 202. Actions that the other clients 210 may perform via the second API set 212 include determining when the user signs in or signs out, and obtaining the instant messaging contact list, obtaining presence information as to who else is online, and so forth. Further, the other clients 210 may take advantage of other instant messaging functionality by launching the messenger user interface component 204 and sending the user to the user interface component 204, e.g., by transferring focus to a window of the user interface component 204. Alternatively, the program could provide its own user interface, such as a dialog box or the like, or host the user interface component 204. In another alternative, a client program 210 could send messages and data on its own via the messenger background component 202, without invoking the user interface component 204.

The operations that the client programs 210 can perform include sign-in/sign-out, changing a stored password, changing the online status and changing the familiar name. Further, the client programs may initiate an instant message conversation with another user, obtain a list of currently online users (buddies), and initiate invitations to allow application sharing, remote control, gaming, and so forth.

To this end, the client programs communicate with the messenger background component 202, which may be accomplished in various ways in alternative implementations. For example, one way (in a suitable environment) is via AppleEvents, that is, while the messenger component 202 is running, the messenger component 202 can receive AppleEvents from the other client programs 210. Further, the messenger component 202 may export functions, e.g., instead of sending AppleEvents, the clients may map the exported functions and call them as if they were in a library. A shared library solution is similar to the exported functions, but cannot work without a background application running.

Exporting functions is straightforward from the client program's perspective, since the client program does not need to construct and send events, but rather simply calls functions as if part of a library. However, every application runs in its own address space, leading to problems. For example, consider two clients, A and B, which use the messenger component's API 212. If client A decides to change the user's friendly name, the new name will be stored in some variable local to client's A address space; not only client B will never see this change, but neither will the messenger component 202. Shared memory may be used to store relevant information, however this does not solve the problem completely, since every client (as well as the messenger component 202) will need to be pooling the shared memory checking for changes. Further, the shared memory implementation depends on the underlying platform. Note that a shared library solution has similar issues, but needs to have an application running to receive messages from the server, and thus is a less desirable solution.

Thus, a combination of events and function calls is one suitable implementation, e.g., while the APIs are implemented using AppleEvents, an additional shared library may be created to translate function calls to corresponding AppleEvents. At the same time, this shared library may contain functions that capture the AppleEvents sent by the messenger component 202 and translate them into callbacks in the client programs 210. As a result, for example, automation scripts may use AppleEvents, while client programs such as a browser may use the shared library without needed to understand the underlying mechanism.

In any event, the underlying events model will generally be described herein. For example, when a client program wants to use instant messaging functionality, the client may send a "RegisterApplication" event. The messenger component 202 maintains a list of registered clients, and sends appropriate AppleEvents back when some relevant property has changed. In one particular implementation, the messenger program's contact list is stored in a local cache that is filled the first time the client program calls the "GetContact" function, and will be updated each time a callback comes from the messenger component. This contact list can be stored using the structures described below.

The messenger background component 202 sends different events to the client programs, including callbacks as described below.

Note that some new functionality may be added to the client application 210 as a result of integration with the messenger component 202. One examples of this includes adding contacts, which may launch the messenger user interface component 204, and provide an empty "Add Contact" wizard as if the user had chosen the "Add a Contact . . . " option in the messenger user interface component 204. For such an implementation, the "by email" dialog may be started to pre-populate the e-mail address edit box with the selected address. Sending attachments (files) may be accomplished by calling the code that starts file transfers, as when dragging and dropping a file in the contact table. Viewing instant messaging history for a contact is another enhancement.

To use functionality from a client program 210, during a sign-in process, a message request launches the messenger user interface component 204 and behaves as if the user had selected "Sign In . . . " from the user interface main menu. That results in signing in automatically if the password is saved, or asking the user to enter the password (and any related data) if not saved. The client can also obtain sign-in status, e.g., a current implementation of "GetSignInStatus" receives an email address and evaluates the status of that logon user. The functionality may respond with the current user's status.

Data structures are provided to store the instant messenger contact list, as set forth in the tables below:

```
typedef struct
{
    Str255          stEmail;
    UniChar
    rgwchFriendlyName[256];
    UInt32          status;
    Boolean         fBlocked;
    uchar           unused[3];
} IMsgrContact;
```

To represent the contact list:

```
typedef struct
{
    SInt32          cch;
    IMsgrContact    *pcContacts;
} IMsgrContactList;
```

In this manner, the present invention thus allows an application (or suite of applications) to become a central communications hub by allowing users to communicate in real-time, based on presence information (e.g., which other users are signed in). In other words, any program may offer presence and instant messaging capabilities, whereby instant messaging becomes a highly-useful communication option along the lines of telephone and e-mail. For example, the option to send an instant message may be presented alongside user interface entry points that were previously e-mail only. Further, new entry points will allow users to obtain messenger information of other users ("buddy" information) such as to display a username and online/offline status, and access messenger-specific functionality including sign-in to messenger, add contact to messenger, send and instant message and view recent instant messenger conversations. Note that at present, email-based contacts and messenger buddies comprise distinct lists that are not managed together, but these may be merged based on the present invention, e.g., the buddy list (or different buddy lists) may be a subset of at least one contacts list.

Instant messaging access may be provided in a number of ways. For example, a messenger icon may be provided on an appropriate application toolbar such as a reviewing toolbar, such that that when the icon is clicked, the program provides a dropdown menu or the like that lists any online buddies. These options allow the user to either initiate an instant message session or send the document for review via the messenger's file transfer capabilities. Other mechanisms can be used to access instant messaging options, such as right-clicking at an appropriate location, pressing a keyboard key combination, and any other suitable way to instruct the program that instant messaging is desired, e.g., clicking on a pop-up notification shown within the program that indicates that another user has signed in.

Figure 4:
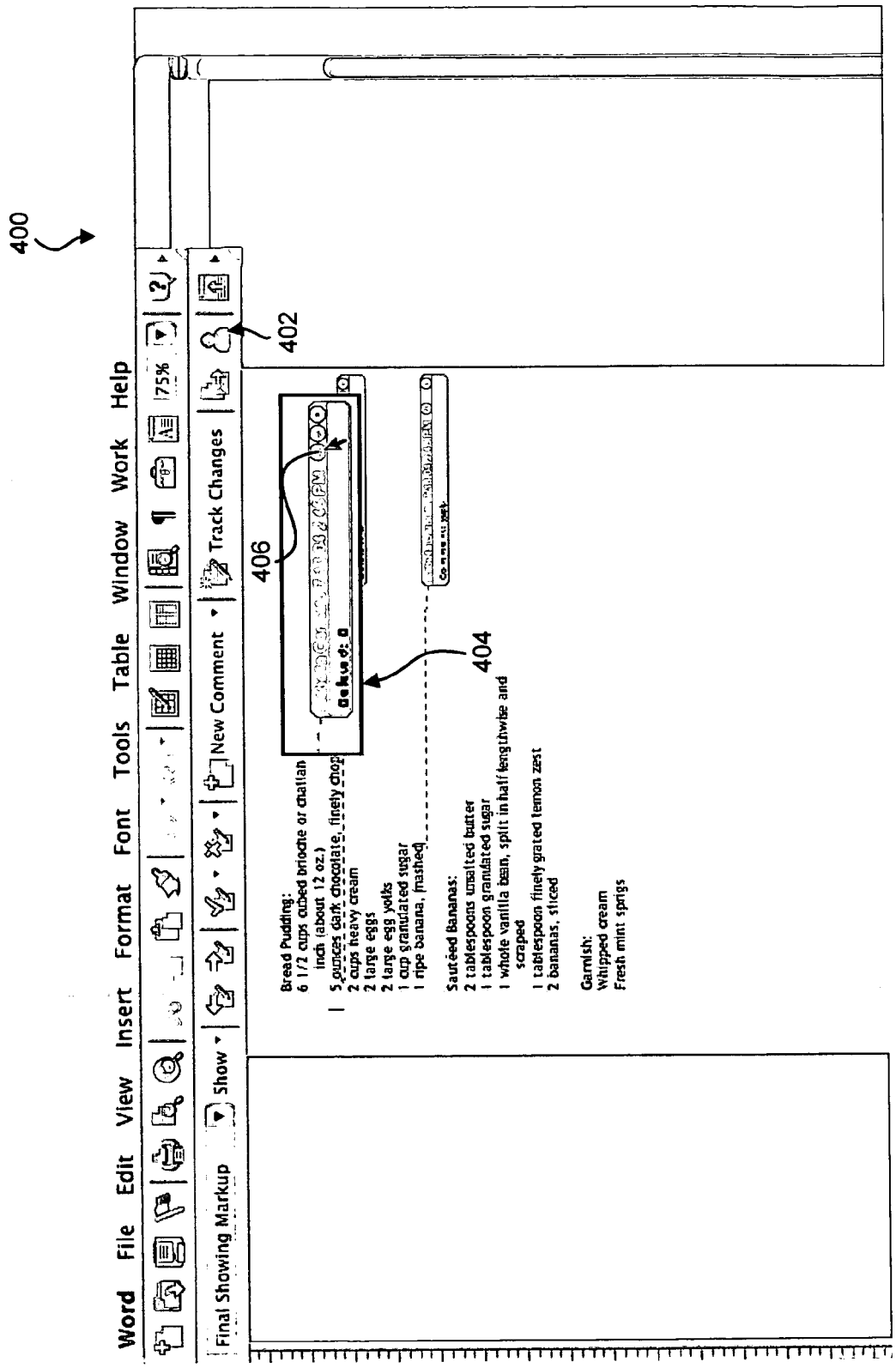
FIG. 4 is a is a screen shot showing how a client program can access instant messenger functionality in accordance with various aspects of the present invention.
Figure 5:
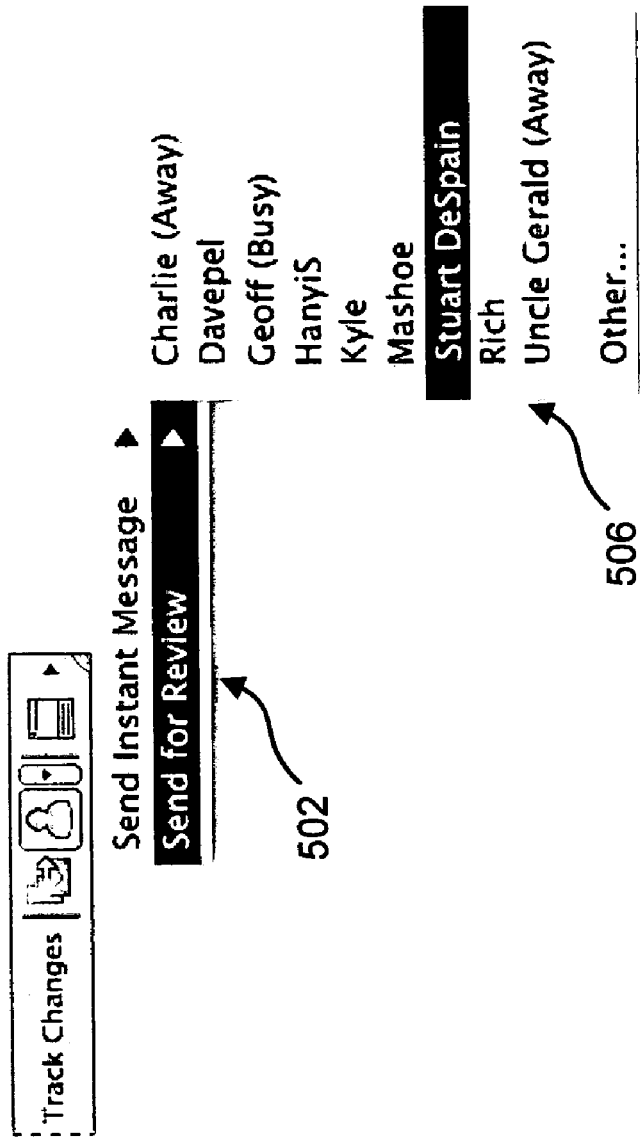
FIG. 5 is a screen shot showing an alternative way in which a client program can access instant messenger functionality in accordance with various aspects of the present invention.

By way of example, FIG. 4 shows a screenshot 400 of a word processing program in which an instant messenger icon 402 is provided in a toolbar. As represented in FIG. 5, clicking this icon 402 may, for example, result in a dropdown menu 502, which may have a submenu 506 comprising the buddy list with current status information. Thus, the instant messenger icon may be used to list online buddies, from which the user may initiate an instant messaging session or send the document (the one currently being edited) for review via messenger's file transfer feature.

In accordance with another aspect of the present invention, there is provided a mechanism to facilitate document collaboration using instant messaging. For example, word processing programs are on example of a by which programs that may be used in collaborative environments, with a document shared among one or more originators and reviewers. One way to maintain the integrity of a document is to track which user made which changes, so that anyone reviewing the edited document can trace specific changes back to their originators. To this end, interlineations 404 (FIG. 4), or markup balloons, represent document changes that are shown in a manner that does not obscure the original document.

The present invention may be used to integrate applications and instant messaging by incorporating document sharing directly into the workflow, without having to leave the program. More particularly, a markup balloon contains an originator/reviewer label. By connecting this label to an instant message address, the present invention can provide a direct way for a user to communicate with another user via instant messaging. In one implementation, in documents with many markup balloons, having the <Originator/Reviewer Name> and <Type of Change:> highlighted in the beginning of their respective balloon body parts allows for more effective navigation.

Quick and seamless collaboration between users via instant messaging, when working on a shared document, is accomplished by having a button 406 that appears on the comment or change bubbles that provides access to an instant message conversation. To this end, the name of the user who created the bubble is taken (from the Word document), and the user looked up in a contact list, locating an instant messaging address when available. If an instant messaging address is available, this button will be enabled and will allow the user to launch an instant messaging conversation. In one implementation, the button is only enabled if there is an exact user name match and as long as there are no name conflicts.

Figure 6:
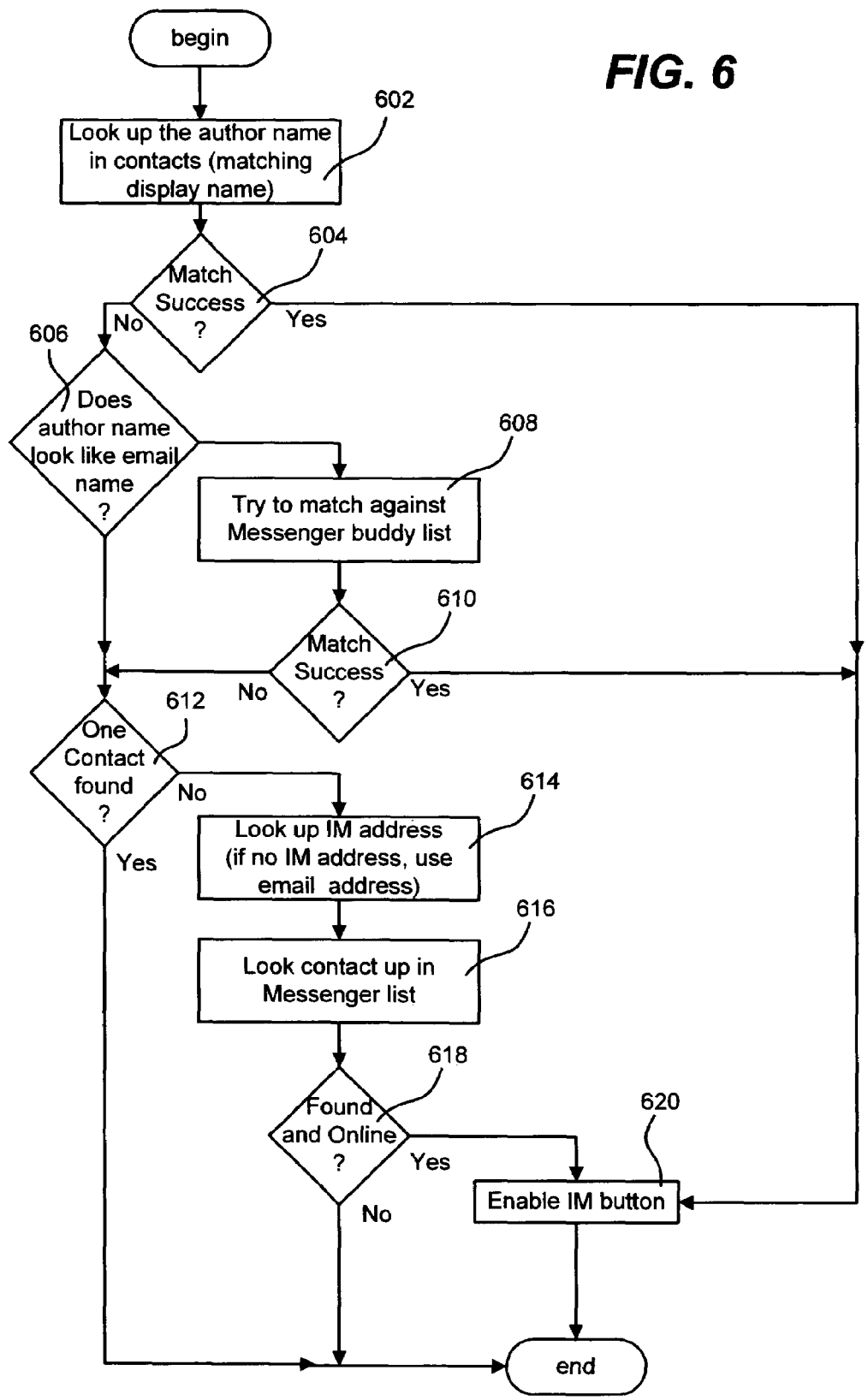
FIG. 6 is a flow diagram representing logic for enabling an instant messenger icon in accordance with various aspects of the present invention.

The general logic of an "Author-to-IM-contact matching" is represented in FIG. 6, where the author name is looked up in a contacts for a matching display name at step 602, and evaluated for a match at step 604. If that succeeds, it is used. Otherwise, if the author name looks like an email address as tested via step 606, an attempt is made try to match it against the messenger buddy list at step 608; if that succeeds as evaluated at step 610, it is used.

If exactly one contact is found at step 612, the instant messaging address is looked up at step 614 (if there is no instant messaging address, the email address is used). That contact is then looked up in the messenger list (step 616). If found and the user is online (step 618), the button (e.g., 406 of FIG. 4) is enabled.

Figure 7:
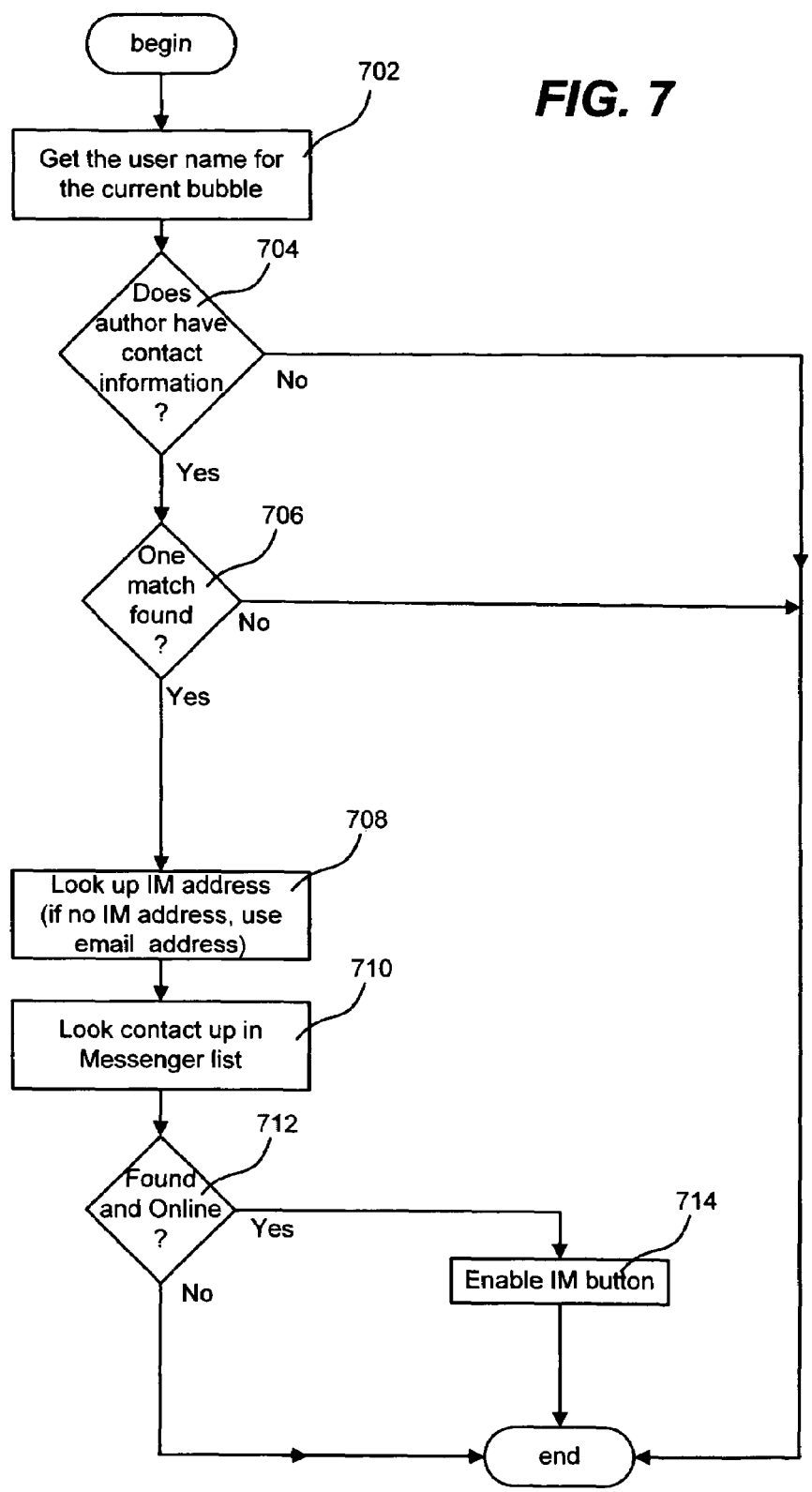
FIG. 7 is a flow diagram representing logic for enabling an instant messenger icon from a markup balloon in accordance with various aspects of the present invention.

In one particular implementation represented in FIG. 7, the comment bubble code is enabled by obtaining the user name for the current bubble, (step 700) which is found in a ABX-.pxstzBubbleAuthor field. A function named use FGetContactNameRange is used at step 704 to determine if the author has contact information. Note that this function allows the mechanism to determine if there is exactly one match for the name at step 706; if more matches are found, the button will be disabled because this implementation supports only a single match. This call also uses a cached list of contacts, providing performance benefits.

Step 708 represents obtaining the instant messaging address information for that contact, using email if no instant messaging address is explicitly specified. Step 710 looks up that instant messaging address in the messenger list. If it exists with the appropriate online status (step 712), the button will be operational via step 714.

Programming Interface

The exported functionality is divided into four parts, with the "basic functionality" comprising an enhancement of what other messenger services support. The basic functionality allows the client to sign-in/out, get/set user properties and open a preferences dialog. Two other parts, "Contacts" and "Groups" allow the client to manage contacts and groups, respectively, generally by adding, removing and getting properties such as name or status. A "Sessions" part allows the client to register in order to receive callbacks from the messenger component 202, and initiate sessions with other users to send messages, files, and so forth. This part also implements lock and key functionality, that is, functions and those which require the API to be "unlocked" verify that the calling program is authentic, in order to avoid third party applications faking AppIds and making the messenger component 202 believe it is another client that unlocked the interface. This may be accomplished by checking the process identifier of the AppleEvent sender.

Basic Functionality
    Sign in/out
    Get/set sign in name
    Get sign in status
    Get/set friendly name
    Get MSN Messenger version
    Show preferences
    Get Hotmail count
    Send Instant message
    Send file
    Send Hotmail
    Callbacks
    On sign in/out
    On status change
    On friendly name change
    On Hotmail count change
    Notes that to have callbacks, RegisterApplication and UnRegisterApplication or the like may be provided (e.g., in the "Sessions" section).

Contacts
    Get contact count
    Start add contact
    Remove a contact
    Get contact properties (sign-in name, friendly name, sign-in status block/page status)
    Block/unblock contact
    View instant message history
    Get whole contact list
    Callbacks
    On add/remove contact
    On contact property changed Groups
    Get group count
    Add a new group
    Remove a group
    Rename a group
    Get/set group name
    Get whole group list
    Move/Copy contact between groups
    Remove contact from group Callbacks
  On add/remove group
  On group name changed
  On contact moved/copied
  On contact removed from group
Sessions
  Register/unregister application
  Get lock status
  Request/responde challenge
  Callbacks
    On challenge
    On result
    On enable In one implementation, a generic method is used that reads "event descriptions" from a static table. These event descriptions contain the event number, the type for each parameter, and the function/method to call after getting the parameters. As a result, adding new functionality to the API is straightforward, and is performed by adding a new entry to the table, without having to use the main method or add methods to get the parameters from an AppleEvent. Note that the opposite may be done to implement callbacks, e.g., by including in the code functions or methods equivalent to the callbacks. Each of these methods will generate an AppleEvent and send it to the client application. Note that these two sets of APIs may be reused when implementing a Messenger Shared Library to be loaded by the client program. Callbacks require locating the proper places to add calls to the equivalent functions, e.g., if an application requests to change the user friendly name, the messenger component 202 receives the event, inform the server, updates the messenger interface and then calls back other clients to inform them of the new name.

Clients may also use version control in order to verify which APIs are implemented in the version of the messenger component that is running. Calling an IMsgr_Version function will return a major and a minor version number, by which the client may verify compatibility. Additionally, when introducing new APIs in subsequent versions, the new corresponding functions in the shared library may check for the messenger component version and return a "function not implemented" error.

In one implementation, the code contains an AppleEvent dictionary stored in an aedt resource, which specifies the translation between FOUR_CHAR_CODE and integer event IDs. This resource is contained in the file BMMSApp.rsrc.

An event related data structure is shown below, where N is the maximum number of parameters allowed in an event or function:

EventDescription=<AENumber, FunctionPointer, ParamType1, ParamType2, . . . , ParamTypeN, NULL>.

In one implementation, the number is three, with the structure implemented in a series of macros that automatically generate functions that read each of the parameters from an AppleEvent and store them into variables; to later call an implementation function that takes them as input parameters. The table contains AENumber and FunctionPointer in each record.

IMsgrSessionManager is a class that is basically a list of registered programs; registering assigns an identifier to the program and adds it to the list, while unregistering removes the specified program. There is only one session manager:

Application=<AppId, Name, Lock> where AppId is an identifier for the application, such as the operating system process ID, and Lock is the object that handles the lock and key status of the application.

The following describe an internal AppleEvents implementation, which is use to communicate; for events except IMsgrSessionManager_RegisterApplication, IMsgrSessionManager_UnRegisterApplication, and IMsgr_GetVersion, if the Application is not registered to Messenger App, nothing will be done and an error returned.

The events will have class id "Rmsg",

---

Basic functionality

IMsgr_SignIn
Try to sign in using the email and password provided in the message.
Event ID    Msg0
Parameters  MemA    Char    Email address
            MpwD    Char    User password
            Mchk    Long    Checksum (not used, must be 0)
Return value    None
Error codes     0           Succeeded
                −12101      User already signed in
                −12102      Cannot access preferences file
                −12103      Already signing in/signing out
IMsgr_AutoSignIn
Will try to sign in using the default credentials stored in the preference file.
Event ID    Masi
Parameters  None
Return value    None
Error codes     0           Succeeded
                −12101      User already signed in
                −12102      Cannot access preferences file
                −12103      Already signing in/signing out
IMsgr_SignOut
Try to sign out.
Event ID    Msg1
Parameters  None
Return value    None
Error codes     0           Succeeded
                −12100      No user currently signed in
                −12102      Cannot access preferences file
                −12103      Signing in/already signing out
                −12106      Checksum does not match
                −12107      Email doesn't match currently signed in user
                −12108      Password doesn't match currently signed in user
                −12109      User selected cancel in the quit alert
IMsgr_ShowSignInDialog
Show the sign in dialog.
Event ID    MVsi
Parameters  None
Return value    None
Error codes     0           Succeeded
                −12101      User already signed in
IMsgr_GetSignInName
Get the current user's email address.
Event ID    MGsn
Parameters  None
Return value    Char        Email address of the signed in user
Error codes     0           Succeeded
                −12100      No user currently signed in
IMsgr_SetDefaultSignInName
Set the default sign-in user's email address stored in Messenger's local preferences.
Event ID    MSsn
Parameters  Msin    Char    Email address
Return value    None
Error codes     0           Succeeded
                (OSErr)     cannot write preferences file
IMsgr_SetPassword
Changes the default password stored in messenger's local preferences.
Event ID    Msg3
Parameters  MemA    Char    Email address
            MpwD    Char    User password
            Mchk    Long    Checksum (not used, must be 0)
            MnpW    Char    New password -continued

| | | | |
|---|---|---|---|
| Return value | None | | |
| Error codes | 0 | Succeeded | |
| | −12100 | No user currently signed in | |
| | −12106 | Checksum does not match | |
| | −12107 | Email doesn't match currently signed in user | |
| | −12108 | Password doesn't match currently signed in user | |

IMsgr_GetStatus
Get the current user's online status.

| | | | |
|---|---|---|---|
| Event ID | MGst | | |
| Parameters | None | | |
| Return value | UInt32 | Online status. | |
| | | 'FLN': offline | |
| | | 'NLN': online | |
| | | 'HDN': hidden | |
| | | 'BSY': busy | |
| | | 'IDL': idle | |
| | | 'BRB': be right back | |
| | | 'AWY': away | |
| | | 'PHN': on the phone | |
| | | 'LUN': out to lunch | |
| Error codes | 0 | Succeeded | |

IMsgr_SetStatus
Changes the current user's online status.

| | | | |
|---|---|---|---|
| Event ID | Msg4 | | |
| Parameters | MemA | Char | Email address |
| | MpwD | Char | User password |
| | Mchk | Long | Checksum (not used, must be 0) |
| | MnsT | Uint32 | New status |
| Return value | None | | |
| Error codes | 0 | Succeeded | |
| | −12100 | No user currently signed in | |
| | −12106 | Checksum does not match | |
| | −12107 | Email doesn't match currently signed in user | |
| | −12108 | Password doesn't match currently signed in user | |
| | −12110 | Status same as requested | |

IMsgr_GetFriendlyName
Get the current user's email address.

| | | | |
|---|---|---|---|
| Event ID | MGbn | | |
| Parameters | None | | |
| Return value | Unicode text | Buddy friendly name | |
| Error codes | 0 | Succeeded | |
| | −12100 | No user currently signed in | |

IMsgr_SetFriendlyName
Changes the current user's buddy name.

| | | | |
|---|---|---|---|
| Event ID | Msg2 | | |
| Parameters | MemA | Char | Email address |
| | MpwD | Char | User password |
| | Mchk | Long | Checksum (not used, must be 0) |
| | MnnM | Unicode text | New friendly name |
| Return value | None | | |
| Error codes | 0 | Succeeded | |
| | −12100 | No user currently signed in | |
| | −12106 | Checksum does not match | |
| | −12107 | Email doesn't match currently signed in user | |
| | −12108 | Password doesn't match currently signed in user | |

IMsgr_Preferences
Brings up the preferences dialog

| | | | |
|---|---|---|---|
| Event ID | Pref | | |
| Parameters | None | | |
| Return value | None | | |
| Error codes | 0 | Succeeded | |

IMsgr_GetVersion
Returns Messenger's version number.

| | | | |
|---|---|---|---|
| Event ID | Mver | | |
| Parameters | None | | |
| Return value | Char | Version number (currently 3.0) | |
| Error codes | 0 | Succeeded | |
| | −12100 | No user currently signed in | |

IMsgr_GetSignInStatus
Get the current sign-in status for the specified user.

| | | | |
|---|---|---|---|
| Event ID | MGss | | |

-continued

| | | | |
|---|---|---|---|
| Parameters | MemA | Char | Email address |
| Return value | Uint32 | Signed in/Not signed in/Signing in or out | |
| Error codes | 0 | Succeeded | |

IMsgr_GetAnySignInStatus
Get the current sign-in status for the current user.

| | | | |
|---|---|---|---|
| Event ID | MGAs | | |
| Parameters | None | | |
| Return value | UInt32 | Signed in/Not signed in/Signing in or out | |
| Error codes | 0 | Succeeded | |

IMsgr_GetUnreadEmailCount
Get the current count of Hotmail's inbox unread messages.

| | | | |
|---|---|---|---|
| Event ID | MUEC | | |
| Parameters | None | | |
| Return value | Uint32 | Email count | |
| Error codes | 0 | Succeeded | |

IMsgr_ShowContactWindow
Show the main window and bring it to the front.

| | | | |
|---|---|---|---|
| Event ID | MCWn | | |
| Parameters | None | | |
| Return value | None | | |
| Error codes | 0 | Succeeded | |

Callbacks

DMsgr_OnSignIn
Sent when sign-in process finishes successfully or failing.

| | | | |
|---|---|---|---|
| Event ID | Masi | | |
| Parameters | MBoo | Boolean | Did the process finish successfully |
| | Mrtn | SInt16 | Error code if sign-in failed |
| | MEMs | Str255 | Error description if sign-in failed |

DMsgr_OnSignOut
Sent when a user logged off successfully.

| | | | |
|---|---|---|---|
| Event ID | Msg1 | | |
| Parameters | None | | |

DMsgr_OnMyFriendlyNamechange

| | | | |
|---|---|---|---|
| Event ID | Msg3 | | |
| Parameters | MnnM | Unicode text | New friendly name |

DMsgr_OnMyStatusChange
Sent when the user online status is changed successfully.

| | | | |
|---|---|---|---|
| Event ID | Msg4 | | |
| Parameters | MnsT | UInt32 | New user status |

DMsgr_OnNewEmail
Sent when a new email message is received by Hotmail.

| | | | |
|---|---|---|---|
| Event ID | MNEm | | |
| Parameters | Mfrn | Unicode text | Sender's friendly name |

DMsgr_OnUnreadEmailChange
Sent when Hotmail's inbox unread email message count changes.

| | | | |
|---|---|---|---|
| Event ID | MUEC | | |
| Parameters | MEmC | Long Integer | New unread email count |

DMsgr_OnQuit
Sent when the Messenger Daemon is quitting.

| | | | |
|---|---|---|---|
| Event ID | Mqui | | |
| Parameters | None | | |

Contacts

IMsgrContacts_Count
Get the number of contacts on messenger's contact list

| | | | |
|---|---|---|---|
| Event ID | MCCo | | |
| Parameters | None | | |
| Return value | Long | Number of contacts | |
| Error codes | 0 | Succeeded | |

IMsgrContacts_GetItem
Get the ID of the contact at the specified index

| | | | |
|---|---|---|---|
| Event ID | MCIt | | |
| Parameters | Mind | Long | Index for the contact inside the contacts list |
| Return value | Char | Contact ID | |
| Error codes | 0 | Succeeded | |
| | −12105 | Invalid index | |

Contacts

IMsgrContacts_Add
Brings up the add contact dialog to add contacts in the default group.
Event ID      MCAd
Parameters    None
Return value  None
Error codes   0          Succeeded
IMsgrContacts_Remove
Remove a contact from all the groups
Event ID      MCRm
Parameters    Mcid       Char       Contact ID to be removed.
                                    Returned by
                                    IMsgrContacts_GetItem.
Return value  None
Error codes   0          Succeeded
              -12105     Invalid Contact ID
IMsgrContacts_GetList
Get the contact list.
Event ID      MCGL
Parameters    None
Return value  AEDescList AEDescList of AERecord, where each
                         record represents a contact. Each AERecord
                         contains:
                         Char: sign-in name
                         Unicode text: friendly name
                         UInt16: status
                         Boolean: blocked?
Error codes   0          Succeeded
IMsgrContacts_ImportContactList
Add the contacts specified in the list.
Event ID      MCIL
Parameters    IDsc       AERecord   The record contains:
                                    XML (Char): XML string
                                    containing the contacts as
                                    in a ctt file
                                    Mgnm (Unicode text):
                                    optional group name
                                    fPCt (Boolean): preserve
                                    the contacts already in the
                                    group
Return value  None
Error codes   0          Succeeded
              -12100     USer not signed in
IMsgrContact_GetSignInName
Gets the contact's email address.
Event ID      MCSN
Parameters    Mcid       Char       Contact Id
Return value  Char       Contact's email address
Error codes   0          Succeeded
              -12105     Contact Id is invalid
IMsgrContact_GetFriendlyName
Gets the contact's friendly name.
Event ID      MCFN
Parameters    Mcid       Char       Contact Id
Return value  Unicode text  Contact's friendly name
Error codes   0          Succeeded
              -12105     Contact Id is invalid
IMsgrContact_GetStatus
Gets the contact's status.
Event ID      MCSt
Parameters    Mcid       Char       Contact Id
Return value  Uint32     Contact's status (see IMsgr_GetStatus)
Error codes   0          Succeeded
              -12105     Contact Id is invalid
IMsgrContact_CanPage
Check if the user can page this contact.
Event ID      MCCP
Parameters    Mcid       Char       Contact Id
Return value  Boolean    Contact's page status
Error codes   0          Succeeded
              -12105     Contact Id is invalid
IMsgrContact_GetBlocked
Check if the user decided to block this contact.
Event ID      MCGB
Parameters    Mcid       Char       Contact Id
Return value  Boolean    Contact's block status
Error codes   0          Succeeded
              -12105     Contact Id is invalid

Contacts

IMsgrContact_SetBlocked
Try to set the blocked status for a contact.
Event ID      MCSB
Parameters    Mcid       Char       Contact Id
              MBoo       Boolean    New block status
Return value  None
Error codes   0          Succeeded
              -12105     Contact Id is invalid
              -12200     Block/unblock failed (current user not
                         signed in or user canceled in the dialog)
IMsgrContact_AddToList
Bring up the add contact dialog and prepopulate the email field with the
specified address
Event ID      MCAL
Parameters    Mcid       Char       Contact Id
Return value  None
Error codes   0          Succeeded
              -12100     User not signed in
IMsgrContact_ViewIMHistory
Show instant message history for the specified contact.
Event ID      MVHi
Parameters    Mcid       Char       Contact Id
Return value  None
Error codes   0          Succeeded
              -12100     User not signed in

Callbacks

DMsgrContacts_OnAdd
Sent when a new contact is added to the buddy list.
Event ID      MAdc
Parameters    MCRc       AERecord   Full contact information as
                                    in IMsgrContacts_GetList
DMsgrContacts_OnRemove
Sent when a contact is removed from the buddy list.
Event ID      MRmC
Parameters    Mcid       Char       Contact Id
DMsgrContact_OnFriendlyNameChange
Sent when a contact's friendly name changed.
Event ID      MCFN
Parameters    Mcid       Char       Contact Id
              Mfrn       Unicode text  New friendly name
DMsgrContact_OnStatusChange
Sent when a contact's status changed.
Event ID      MCSt
Parameters    Mcid       Char       Contact Id
              Mstt       UInt32     New contact's status
DMsgrContact_OnPagerChange
Sent when a contact's pager status changed.
Event ID      MCCP
Parameters    Mcid       Char       Contact Id
              MBoo       Boolean    New pager status
DMsgrContact_OnBlockedChange
Sent when a contact's blocked status changed.
Event ID      MCGB
Parameters    Mcid       Char       Contact Id
              MBoo       Boolean    New blocked status

Groups

IMsgrGroups_Count
Get the number of groups on messenger's contact list
Event ID      MGCo
Parameters    None
Return value  Long       Number of groups
Error codes   0          Succeeded
IMsgrGroups_GetItem
Get the ID of the contact at the specified index

Groups (continued)

| | | | |
|---|---|---|---|
| Event ID | MGIt | | |
| Parameters | Mind | Long | Index for the group inside the groups list |
| Return value | Long | Group ID | |
| Error codes | 0 | Succeeded | |
| | −12111 | Invalid index | |

IMsgrGroups__Create
Get the ID of the contact at the specified index

| | | | |
|---|---|---|---|
| Event ID | MGCr | | |
| Parameters | Mgnm | Char | Name to be given to the group |
| Return value | none | | |
| Error codes | 0 | Succeeded | |

IMsgrGroups__Remove
Get the ID of the contact at the specified index

| | | | |
|---|---|---|---|
| Event ID | MGRm | | |
| Parameters | Mgid | Long | Group ID to be removed. Returned by IMsgrGroups__GetItem. |
| Return value | None | | |
| Error codes | 0 | Succeeded | |
| | −12111 | Invalid group ID | |
| | −12112 | Group cannot be removed because it is not empty | |

IMsgrGroups__RemoveNamedGroup
Get the ID of the contact at the specified index

| | | | |
|---|---|---|---|
| Event ID | MGRN | | |
| Parameters | Mgnm | Unicode string | Name of the group to be removed |
| | fPCt | Boolean | Preserve contacts |
| | QIET | Boolean | Don't show any dialogs |
| Return value | None | | |
| Error codes | 0 | Succeeded | |
| | −12100 | User not signed in | |

IMsgrGroups__GetList
Get the group list.

| | | | |
|---|---|---|---|
| Event ID | MGGL | | |
| Parameters | None | | |
| Return value | AEDescList | AEDescList of AERecord, where each record represents a contact. Each AERecord contains: SInt32: service type Long: group ID Unicode text: group name | |
| Error codes | 0 | Succeeded | |

IMsgrGroup__GetName
Get group name

| | | | |
|---|---|---|---|
| Event ID | MGNm | | |
| Parameters | Mgid | long | Group ID whose name we want to get Returned by IMsgrGroups__GetItem. |
| Return value | Unicode text | Group name | |
| Error codes | 0 | Succeeded | |
| | −12111 | Group ID invalid | |

IMsgrGroup__SetName
Rename a group

| | | | |
|---|---|---|---|
| Event ID | MGRn | | |
| Parameters | Mgid | Long | Group ID to be renamed. Returned by IMsgrGroups__GetItem. |
| | Mgnm | Unicode text | New group name |
| Return value | None | | |
| Error codes | 0 | Succeeded | |
| | −12111 | Group ID invalid | |

IMsgrGroup__MoveContact
Move a contact from one group to another

| | | | |
|---|---|---|---|
| Event ID | MGMv | | |
| Parameters | Mgif | long | Group ID containing the contact |
| | Mgid | Long | Group ID where we want to move the contact |
| | Mcid | Char | Contact ID we want to move |
| Return value | None | | |
| Error codes | 0 | Succeeded | |
| | −12105 | Contact ID invalid | |
| | −12111 | Group ID invalid | |
| | −12113 | Contact is not included in original group | |

IMsgrGroup__CopyContact
Copy a contact to another group

| | | | |
|---|---|---|---|
| Event ID | MGCp | | |
| Parameters | Mgid | Long | Group ID where we want to copy the contact |
| | Mcid | Char | Contact ID we want to copy |
| Return value | None | | |
| Error codes | 0 | Succeeded | |
| | −12105 | Contact ID invalid | |
| | −12111 | Group ID invalid | |

IMsgrGroup__RemoveContact
Remove a contact from the specified group

| | | | |
|---|---|---|---|
| Event ID | MGRC | | |
| Parameters | Mgid | Long | Group ID where we want to remove the contact from |
| | Mcid | Char | Contact ID we want to remove |
| Return value | None | | |
| Error codes | 0 | Succeeded | |
| | −12105 | Contact ID invalid | |
| | −12111 | Group ID invalid | |
| | −12113 | Contact is not included in group | |

IMsgrGroup__ContainsContact
Check if the group contains a contact

| | | | |
|---|---|---|---|
| Event ID | MGCC | | |
| Parameters | Mgid | Long | Group ID where we want to search for the contact |
| | Mcid | Char | Contact ID we want to find |
| Return value | Boolean | Boolean value specifying if the contact is included in the group or not | |
| Error codes | 0 | Succeeded | |
| | −12105 | Contact ID invalid | |
| | −12111 | Group ID invalid | |

Callbacks

DMsgrGroups__OnAdd
Sent when a group is added

| | | | |
|---|---|---|---|
| Event ID | MGCr | | |
| Parameters | | | |
| | Mgid | Long | Group Id |

DMsgrGroups__OnRemove
Sent when a group is removed

| | | | |
|---|---|---|---|
| Event ID | MGRm | | |
| Parameters | | | |
| | Mgid | Long | Group Id |

DMsgrGroup__OnNamechange
Sent when a group name changes

| | | | |
|---|---|---|---|
| Event ID | MGRn | | |
| Parameters | | | |
| | Mgid | Long | Group Id |
| | Mgnm | Unicode text | Group name |

DMsgrGroup__OnContactMove
Sent when a contact is moved from one group to another

| | | | |
|---|---|---|---|
| Event ID | MGMv | | |
| Parameters | Mcid | Char | Contact Id |
| | Mgif | Long | Group Id the contact is moved from |
| | Mgid | Long | Group Id the contact is moved to |

DMsgrGroup__OnContactCopy
Sent when a contact is copied from one group to another

| | | | |
|---|---|---|---|
| Event ID | MGCp | | |
| Parameters | Mcid | Char | Contact Id |
| | Mgid | Long | Group Id the contact is copied to |

DMsgrGroup__OnContactRemove
Sent when a contact is removed from a group

| | | | |
|---|---|---|---|
| Event ID | MGRC | | |
| Parameters | Mcid | Char | Contact Id |
| | Mgid | Long | Group Id |

| Sessions |
|---|
| IMsgrSessionManager_RegisterApplication<br>Register an application with messenger so that it can receive callback notifications.<br>Event ID    MReg<br>Parameters    Mapp    Char    Application Id<br>Return value    None<br>Error codes    0    Succeeded<br>    −12300    Session manager not created yet<br>    −12301    Application already registered<br>IMsgrSessionManager_RegisterAndRetain<br>Register an application with messenger so that it can receive callback notifications. Additional flag specifying if the client retains the Messenger Daemon running.<br>Event ID    MRgR<br>Parameters    Mapp    Char    Application ID<br>    Mkrn    Boolean    Keep running (retain Daemon)<br>Return value    None<br>Error codes    0    Succeeded<br>    −12300    Session manager not created yet<br>    −12301    Application already registered<br>IMsgrSessionManager_UnRegisterApplication<br>UnRegister an application with messenger so that it will no longer receive callback notifications.<br>Event ID    MUnr<br>Parameters    None<br>Return value    None<br>Error codes    0    Succeeded<br>    −12300    Session manager not created yet<br>    −12302    Application is not registered<br>IMsgrLock_Status<br>Get the lock & key status.<br>Event ID    MLgs<br>Parameters    Mapp    Char    Application Id<br>Return value    SInt16    Lock & key status<br>    1: Locked<br>    2: Tying to unlock<br>    3: Unlocked<br>    4: Unlock failed<br>Error codes    0    Succeeded<br>    −12302    Application is not registered<br>IMsgrLock_RequestChallenge<br>Request a challenge from the server.<br>Event ID    MLrc<br>Parameters    Mapp    Char    Application Id<br>Return value    None<br>Error codes    0    Succeeded<br>    −12302    Application is not registered<br>    −12304    Already tried to unlock and failed<br>    −12305    Already trying to unlock<br>    −12306    Already unlocked<br>    −12307    Server doesn't support lock & key<br>IMsgrLock_SendResponse<br>Send the lock&key response to the server.<br>Event ID    MLsr<br>Parameters    Mapp    Char    Application Id<br>    MLSt    Char    Response string<br>Return value    None<br>Error codes    0    Succeeded<br>    −12302    Application is not registered<br>    −12304    Already tried to unlock and failed<br>    −12305    Already trying to unlock<br>    −12306    Already unlocked<br>    −12307    Server doesn't support lock & key<br>IMsgr_InstantMessage<br>Initiate a chat session with the contact with the Contact id.<br>Event ID    MSim<br>Parameters    Mcid    Char    Contact Id<br>Return value    None<br>Error codes    0    Succeeded<br>    −12100    No user currently signed in<br>    −12104    Current user isn't online<br>    −12105    Contact Id invalid<br>    −12300    Session manager not created yet<br>    −12302    Application is not registered<br>    −12309    Interface is locked |

-continued

| Sessions |
|---|
| IMsgr_SendMail<br>Send an email to the contact specified<br>Event ID    MShm<br>Parameters    Mcid    Char    Contact Id<br>Return value    None<br>Error codes    0    Succeeded<br>    −12100    No user currently signed in<br>    −12104    Current user isn't online<br>    −12105    Contact Id invalid<br>IMsgr_SendFile<br>Transfer a file to the contact specified<br>Event ID    MSFl<br>Parameters    Mcid    Char    Contact Id<br>    Mfss    URL    File to send<br>Return value    None<br>Error codes    0    Succeeded<br>    −12100    No user currently signed in<br>    −12104    Current user isn't online<br>    −12105    Contact Id invalid |

| Callbacks |
|---|
| DMsgrLock_OnChallenge<br>Sent to all registered applications when received a challenge string from the server.<br>And sent to the challenge requester when the request failed to go through.<br>Event ID    Mloc<br>Parameters    MLSt    Char    Challenge string<br>    Mrtn    Sint16    OSErr or<br>    0: Succeed<br>    12303: Request failed to go through<br>DMsgrLock_OnResult<br>Sent to unlock requester<br>Event ID    Mlor<br>Parameters    Mboo    Boolean    Unlock succeed?<br>    Mrtn    Sint16    OSErr or<br>    0: Succeed<br>    12303: Request failed to go through<br>DMsgrLock_OnEnable<br>Sent to unlock requester<br>Event ID    Mloe<br>Parameters    Mboo    Boolean    Unlock succeed? |

The following are the exposed functions:

```
OSErr IMsgr_Preferences( );
OSErr IMsgr_SignIn(Str255, Str255, long);
OSErr IMsgr_SignOut( );
OSErr IMsgr_SetFriendlyName(Str255, Str255, long, UniStr255);
OSErr IMsgr_SetPassword(Str255, Str255, long, Str255);
OSErr IMsgr_SetStatus(Str255, Str255, long, UInt32);
OSErr IMsgr_GetVersion(Str255);
OSErr IMsgr_AutoSignIn( );
OSErr IMsgr_ShowSignInDialog( );
OSErr IMsgr_GetSignInName(Str255);
OSErr IMsgr_SetDefaultSignInName(Str255);
OSErr IMsgr_GetFriendlyName(UniStr255);
OSErr IMsgr_GetStatus(UInt32*);
OSErr IMsgr_InstantMessage(Str255);
OSErr IMsgr_SendFile(Str255, FSSpec, Boolean);
OSErr IMsgr_SendMail(Str255);
OSErr IMsgr_GetSignInStatus(Str255,UInt32*);
OSErr IMsgr_GetAnySignInStatus(UInt32*);
OSErr IMsgr_GetUnreadEmailCount(long*);
OSErr IMsgr_ShowContactWindow( );
OSErr IMsgrContacts_Count(long*);
OSErr IMsgrContacts_GetItem(long,Str255);
OSErr IMsgrContacts_Add( );
```

-continued

```
    OSErr IMsgrContacts_Remove(Str255);
    OSErr IMsgrContacts_GetList (AEDescList*);
    OSErr IMsgrContacts_ImportContactList(AERecord);
    OSErr IMsgrContact_GetSignInName(Str255,Str255);
    OSErr IMsgrContact_GetFriendlyName(Str255,UniStr255);
    OSErr IMsgrContact_GetStatus(Str255,UInt32*);
    OSErr IMsgrContact_CanPage(Str255,Boolean*);
    OSErr IMsgrContact_GetBlocked(Str255,Boolean*);
    OSErr IMsgrContact_SetBlocked(Str255, Boolean);
    OSErr IMsgrContact_AddToList(Str255);
    OSErr IMsgrContact_ViewIMHistory(Str255);
    OSErr IMsgrGroups_Count(long*);
    OSErr IMsgrGroups_GetItem(long, long*);
    OSErr IMsgrGroups_Create(Str255);
    OSErr IMsgrGroups_Remove(long);
    OSErr IMsgrGroups_RemoveNamedGroup(UniStr255, Boolean,
    Boolean);
    OSErr IMsgrGroups_GetList(AEDescList*);
    OSErr IMsgrGroup_GetName(long,UniStr255);
    OSErr IMsgrGroup_SetName(long, UniStr255);
    OSErr IMsgrGroup_MoveContact(Str255, long, long);
    OSErr IMsgrGroup_CopyContact(Str255, long);
    OSErr IMsgrGroup_RemoveContact(Str255, long);
    OSErr IMsgrGroup_ContainsContact(Str255,long,Boolean*);
    OSErr IMsgrSession_RegisterApplication(Str255 stAppID,
    CallbackFunctions cb);
    OSErr IMsgrSessionManager_RegisterAppAndRetain( Str255,
    CallbackFunctions, Boolean);
    OSErr IMsgrSessionManager_UnRegisterApplication( );
    OSErr IMsgrLock_Status(SInt16*);
    OSErr IMsgrLock_RequestChallenge( );
    OSErr IMsgrLock_SendResponse(Str255);
```

The CallbackFunctions structure contains the pointers to the handlers for each of the desired callback events. The pointer should be NULL if the application does not want to handle the corresponding type of event.

```
typedef struct {
    OSErr (*pfnMsgrOnSignIn) ( );
    OSErr (*pfnMsgrOnSignOut) ( );
    OSErr (*pfnMsgrOnBuddyNameChange) (UniStr255);
    OSErr (*pfnMsgrOnStatusChange) (UInt32);
    OSErr (*pfnMsgrOnUnreadEmailChange) (long);
    OSErr (*pfnMsgrOnQuit) ( );
    OSErr (*pfnContactsOnAdd) (Str255);
    OSErr (*pfnContactsOnRemove) (Str255);
    OSErr (*pfnContactOnFriendlyNameChange) (Str255,UniStr255);
    OSErr (*pfnContactOnStatusChange) (Str255,UInt32);
    OSErr (*pfnContactOnPagerChange) (Str255,Boolean);
    OSErr (*pfnContactOnBlockedChange) (Str255,Boolean);
    OSErr (*pfnGroupsOnAdd) (long);
    OSErr (*pfnGroupsOnRemove) (long);
    OSErr (*pfnGroupOnNameChange) (long,Str255);
    OSErr (*pfnGroupOnContactMove) (Str255,long,long);
    OSErr (*pfnGroupOnContactCopy) (Str255,long);
    OSErr (*pfnGroupOnContactRemove) (Str255,long);
    OSErr (*pfnLockOnChallenge) (SInt16,Str255);
    OSErr (*pfnLockOnResult) (SInt16,Boolean);
    OSErr (*pfnLockOnEnable) (Boolean);
} CallbackFunctions;
```

Internal Apple Events Interface

As described above, the functionality was divided into two different components, which communicate using an internal AppleEvents interface comprised of messages. These messages basically respond to the following situations:

From the ServerApp to the Up:
Start logon/logoff
Signed in/out
Logon user status changed
Show sign-in dialog
Logon user friendly name changed
Logon user rename failed
Show add contact dialog
Add contact to list
Remove contact from list
Contact online status
Contact add/remove failure
Contact allowed/blocked
Allow/block contact failed
Import contact list
Group added
Add group failed
Group removed
Group renamed
Contact copied/moved to group
Contact removed from group
Begin IM/send file
Contact started a chat with you
Open IM window
View IM history
Show contact window
Show preferences
Preferences changed
Hotmail count
Hotmail count changed/new mail
Notification received
New URLs from server
Client application update
System messages
Disconnected from the server
Error message from the server
Network connection lost
From the UIApp to the ServerApp
UIApp has launched
UIApp is quitting
Start logon
Cancel logon
Logoff
Is logged on?
Get logon user info
Change logon user friendly name
Set logon user status
Set/get next logon user
Edit logon user page properties
Set logon user save/delete log properties
Set logon user spam preferences
Set/get preferences
Get group/contact lists
Add contact
Batch add users
Remove a contact
Allow/block contact
Batch block/unblock contacts
Send hotmail to contact
Send recruitment mail
Page contact
Upload contact properties
Add a group
Remove a group
Rename a group
Copy/move contact to group
Remove user from group
Expand/collapse group
Get inbox count
Forget Hotmail messages Get chat connection Request URL from server As can be seen from the foregoing detailed description, there is provided a method and system for integrating instant messaging with other computer programs. Instant messaging can thus be used in many real-time scenarios without leaving a running program, such as when collaborating on documents. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   providing an interface to an instant messaging program;
   providing a messenger background component that is separated from the interface and which communicates with the interface with a first set of API function calls to invoke functionality of the instant messaging program;
   providing a second set of API function calls through which the messenger background component communicates with client programs that are separated from the background messenger component; and
   enabling the client programs to access at least some instant messaging functionality of the instant messaging program via the interface and by using the first and second set of API function calls.

2. The method of claim 1 wherein allowing the client programs to access at least some instant messaging functionality comprises allowing a user to sign-in to a messenger service from the client program.

3. The method of claim 1 wherein allowing the client programs to access at least some instant messaging functionality comprises allowing a user to sign-out of a messenger service from the client program.

4. The method of claim 1 wherein allowing the client programs to access at least some instant messaging functionality comprises allowing a user to initiate a conversation from the client program.

5. The method of claim 1 wherein allowing the client programs to access at least some instant messaging functionality comprises allowing a user to obtain data representing other online users from the client program.

6. The method of claim 1 wherein allowing the client programs to access at least some instant messaging functionality comprises allowing a user to send an attachment via the messenger service.

7. The method of claim 1 wherein allowing the client programs to access at least some instant messaging functionality comprises allowing a user to change a instant messaging name from the client program.

8. The method of claim 1 wherein allowing the client programs to access at least some instant messaging functionality comprises allowing a user to change a status from the client program.

9. The method of claim 1 wherein allowing the client programs to access at least some instant messaging functionality comprises allowing a user to set a password from the client program.

10. The method of claim 1 wherein allowing the client programs to access at least some instant messaging functionality comprises allowing a user to send a message from the client program.

11. The method of claim 1 wherein allowing the client programs to access at least some instant messaging functionality comprises allowing the client program to obtain presence information.

12. The method of claim 1 further comprising providing a mechanism in at least one of the client programs to invoke the instant messaging functionality.

13. The method of claim 12 wherein providing the mechanism comprises determining whether a user that changed a document resulting in a markup balloon is online, and if so, providing access to instant messaging functionality via the markup balloon.

14. The method of claim 13 further comprising, automatically determining the user's instant messaging name from data associated with the markup balloon.

15. The method of claim 12 wherein providing the mechanism comprises providing access to instant messaging functionality via a markup balloon in the at least one of the client programs.

16. The method of claim 12 wherein providing the mechanism comprises providing an icon in the at least one of the client programs.

17. The method of claim 16 further comprising, detecting selection of the icon, and in response, communicating from the client program to the instant messaging program to request a buddy list, receiving the buddy list, and presenting the buddy list from within the at least one of the client programs.

18. The method of claim 1 further comprising, communicating contact information to the instant messaging program.

19. The method of claim 1 further comprising, communicating contact information from the client program to the instant messaging program.

20. The method of claim 1 further comprising, calling back from the instant messaging program to the at least one of the client programs.

21. One or more computer-readable storage media having stored computer-executable instructions which when executed perform the method of claim 1.

22. A system comprising:
    a processor;
    an interface to an instant messaging program;
    a running client program; and
    a system memory storing computer-executable instructions which, when executed, by the processor implement a method comprising:
    providing a messenger background component that is separated from the interface and which communicates with the interface with a first set of API function calls to invoke functionality of the instant messaging program;
    providing a second set of API function calls through which the messenger background component communicates with the running client program; and
    enabling the running client program to access at least some instant messaging functionality of the instant messaging program via the interface and by using the first and second set of API function calls.

23. The system of claim 22 wherein based on a communication from the client program, the instant messaging component performs at least one operation of a set containing the following operations: signing in a user to a messenger service, signing out a user from the messenger service, obtaining data representing other online users, changing a instant messaging name from the client program, changing an online status, setting a password, sending a message from the client program, and obtaining presence information.

24. The system of claim 22 further comprising, a mechanism in the client program by which the instant messaging functionality is invoked.

25. The system of claim 24 wherein the mechanism comprises an icon in the client program.

26. The system of claim 25 wherein the icon is displayed on a menu bar of the client program.

27. The system of claim 25 wherein the icon is displayed on a markup balloon displayed within a document opened via the client program.

28. The system of claim 27 wherein the icon is selectively enabled and disabled based on data associated with the markup balloon.

29. The system of claim 28 wherein the data associated with the markup balloon is an identity of a user, and wherein the icon is enabled if the user has a recognized instant messaging address.

30. The system of claim 28 wherein the data associated with the markup balloon is an identity of a user, and wherein the icon is enabled if the user is online.

31. At least one computer-readable storage medium having computer-executable instructions which when executed perform steps, comprising:
  registering a client program with an instant messaging component that is separated from the client program;
  initiating an instant messaging conversation from within the client program by communicating with a messenger background component by using a first set of API function calls which cause the messenger background component to communicate with the instant messaging component with a second set of API function calls, wherein the messenger background component is separated from both of the client program and the instant messaging component; and
  receiving information at the client program via communication received back from the instant messaging component and that is transmitted through the messenger background component.

32. The computer-readable medium of claim 31 wherein initiating an instant messaging conversation from within the client program comprises launching an instant messaging user interface.

33. The computer-readable medium of claim 31 wherein registering the client program includes registering callback information, and wherein receiving information at the client program comprises receiving a callback.

34. The computer-readable medium of claim 31 further comprising communicating instant messaging status information between the client program and the instant messaging component.

35. The computer-readable medium of claim 31 further comprising communicating contact information between the client program and the instant messaging component.

36. The computer-readable medium of claim 31 further comprising communicating group information between the client program and the instant messaging component.

37. The computer-readable medium of claim 31 further comprising communicating session information between the client program and the instant messaging component.

* * * * *